United States Patent [19]

Belart et al.

[11] Patent Number: 4,753,490

[45] Date of Patent: Jun. 28, 1988

[54] BRAKE SYSTEM FOR MOTOR VEHICLES

[75] Inventors: Juan Belart, Walldorf; Wolfram Seibert, Pfungstadt; Norbert Ocvirk, Offenbach; Juergen Schonlau, Niedernhausen, all of Fed. Rep. of Germany

[73] Assignee: Alfred Teves GmbH, Frankfurt am Main, Fed. Rep. of Germany

[21] Appl. No.: 846,258

[22] Filed: Mar. 31, 1986

[30] Foreign Application Priority Data

Mar. 29, 1985 [DE] Fed. Rep. of Germany ....... 3511535

[51] Int. Cl.$^4$ .............................................. B60T 8/44
[52] U.S. Cl. ..................... 303/114; 60/545; 60/563; 60/591; 303/92
[58] Field of Search .............. 60/545, 591, 563, 565, 60/566; 303/92, 114

[56] References Cited

U.S. PATENT DOCUMENTS

| 4,024,712 | 5/1977 | Takeuchi | 60/591 |
| 4,404,803 | 9/1983 | Steffes | 60/591 |
| 4,523,792 | 6/1985 | Belart | 303/92 |
| 4,526,003 | 7/1985 | Leiber | 60/545 |
| 4,530,209 | 7/1985 | Steffes | 60/591 |
| 4,578,951 | 4/1986 | Belart | 60/591 |
| 4,598,955 | 7/1986 | Belart | 60/591 |
| 4,620,750 | 11/1986 | Leiber | 60/591 |
| 4,651,528 | 3/1987 | Carré60 | 563/ |

Primary Examiner—Abraham Hershkovitz
Attorney, Agent, or Firm—James B. Raden; Robert P. Seitter

[57] ABSTRACT

A brake system comprising a hydraulic braking pressure generator (1) to which are connected the brake wheels (6-9); an auxiliary pressure supply system including a hydraulic pump (10) and an auxiliary pressure control valve (12) causing an auxiliary-pressure proportional to the pedal force (F). Pressure-controlled multi-directional valves (27,28) are provided establishing a connection between either the braking pressure generator or the auxiliary pressure supply system and the wheel brakes (6-9). The pressure-controlled multidirectional valves (27,28) are structurally combined with a switching mechanism (41,42) to signal the operating condition of the brake system, in particular, a pressure breakdown or defective conditions of the valves. A connection is established, via one of the pressure-controlled multidirectional valves (27), between the pedal travel simulator and the braking pressure generator (1). The brake system can be applied to a slip-controlled system.

7 Claims, 1 Drawing Sheet

BRAKE SYSTEM FOR MOTOR VEHICLES

BACKGROUND OF THE INVENTION

The present invention relates to a brake system provided for motor vehicles, comprising a pedal-actuated hydraulic braking pressure generator connected to wheel brakes by way of pressure fluid lines. An auxiliary pressure supply system is provided comprising an auxiliary pressure source and an auxiliary pressure control valve causing an auxiliary pressure proportional to the pedal force. Pressure-controlled multidirectional valves are inserted into the pressure fluid conduits between the braking pressure generator and the wheel brakes, which multidirectional conduits, in their inactive or initial position, establish a hydraulic connection between the braking pressure generator and the wheel brakes and which, after change-over into a second switch position, connect the auxiliary pressure control valve in place of the braking pressure generator to the pressure fluid conduits leading to the wheel brakes. A system of this type is described in German Patent Application No. p 35 02 018.0.

Brake systems of this type having a hydraulic brake force booster are known in the art. The systems consist of a single-type or tandem-type master cylinder with a hydraulic brake force booster connected upstream thereof, and of auxiliary pressure supply system comprising a hydraulic pump and a hydraulic accumulator. The brake force booster contains an auxiliary pressure control valve which upon actuation of the brake pedal, brings about an auxiliary pressure which is proportional to the pedal force and transmitted to the pistons in the master cylinder. Moreover, brake circuits can be directly connected to a booster chamber in the interior of which prevails the controlled dynamic pressure. The boosting factor of the brake system is selected by the ratio of the surfaces of a transmission piston in the interior of the brake force booster in relation to the surface of an actuating piston mechanically coupled to the brake pedal. As the brake circuits connected to the master cylinder are designed as static circuits, the volume of the pressure chambers in the master cylinder must be adapted to the respective brake system.

Furthermore, slip-controlled brake systems are known in the art comprising a master cylinder including a hydraulic brake force booster connected upstream thereof. In this system, upon commencement of the slip control, dynamic pressure out of the auxiliary pressure supply system will be introduced, by way of the booster chamber, into the static brake circuits connected to the master cylinder thereby compensating the discharge of pressure fluid into the pressure supply reservoir caused to attain pressure reduction during slip control. Brake systems of this type are rather complex and costly and are described in DE-OS 30 40 561 and DE-OS 30 40 562.

In other types of conventional slip-controlled brake systems comprising a master cylinder having a hydraulic brake force booster connected upstream thereof, upon commencement of the slip control, the pressure fluid conduits between the master cylinder and the wheel brakes are interrupted and the auxiliary pressure source, in place of the master cylinder, by way of the brake force booster, is connected to the wheel brakes. During normal braking operations (i.e., until commencement of the slip control) the circuits connected to the master cylinder, are also strictly static brake circuits.

As compared therewith, the brake system as described in the aforementioned patent provides for strictly dynamic braking as long as the auxiliary pressure supply system is intact. The master cylinder only serves to control the auxiliary pressure control valve and to safeguard the brake function upon occurrence of a defective condition (i.e., upon failure of the auxiliary-pressure source) thereby permitting a comparatively simple construction of the overall brake system. In addition to a master cyinder, an auxiliary pressure source and a control valve, only a small number of multidirectional valves will be needed that are pressure controlled and, hence, can be manufactured at low cost. Moreover, it is advantageous that one master cylinder size can be used for differently dimensioned brake systems because the master cylinder only serves to control the pressure in the dynamic brake circuits.

It is, therefore, the object of the invention to enhance the reliability of the brake system as described and, in particular, safeguard that malfunction in the auxiliary pressure supply system, defective conditions of the pressure controlled valves or the like defects are signalled without delay to enable the driver to adapt himself to the changed situation.

SUMMARY OF THE INVENTION

It has been found that this problem can be solved in a simple and technically advantageous manner by developing a brake system of the aforementioned type in that the pressure-controlled multidirectional valves are structurally combined with a switch mechanism operated upon change-over of the valves. The switch mechanism indicates the operating condition of the brake system, especially a pressure drop in the auxiliary pressure supply system, valve defects, etc.

The configuration of the brake system according to the present invention, hence permits, in simple manner, reliable monitoring of the pressure. Early detection of different types of defects is safeguarded as the switching mechanisms combined with the pressure-controlled multidirectional valves which are essential of the monitoring function, are actuated in each braking operation. The switching mechanism as such is, therefore, incorporated into the monitoring operation. A failure of the monitoring system, hence, can be identified directly, thereby avoiding pretence of an intact system by defective conditions in the monitoring elements.

The combination of the described switching mechanisms with the pressure-controlled multidirectional valves is essential for reliability of the error signalization and the straightforward construction of the switching elements needed, with the valves establishing a connection between the brake pressure generator or the auxiliary-pressure source and the wheel brakes. On the one hand, as stated, an actuation of the switch mechanism in each braking operation is achieved; on the other hand, monitoring is restricted to a pressure comparison that can be readily performed, eliminating a pressure metering in the two circuits (i.e., at the output of the braking pressure generator and in the auxiliary pressure supply system).

As compared therewith, in prior art brake systems comprising hydraulic auxiliary pressure supply systems, the actually prevailing pressure is determined by means of pressure metering sensors, with a signal generated in case of a pressure decrease below a predetermined minimum value. A defective condition of the pressure sensor or of the appertaining circuit cannot be readily identified.

According to a favorable embodiment of the present invention, the output signal of the switch mechanism, after logical combination with a brake actuating signal, can be supplied to a monitoring or alarm circuit. For this purpose, the switching mechanism can be equipped, for example, with an inactive contact connected in series with a contact closing upon application of the brake, for example, a working contact of a stop light switch, and with a warning light turned on in time-lagged relationship. If the braking pressure generator of the brake system according to the invention comprises a variety of hydraulically separated brake circuits which are connected by way of independent pressure-controlled multi-directional valves respectively equipped with a switching mechanism to the wheel brakes, the inactive contacts of the individual switching mechanism are connected in parallel with respect to one another and with the stop light working contact.

In the practice of the invention, for example, double-pressure-controlled three-way/two-position directional valves, suitably, are used as multidirectional valves, which, as long as the braking pressure at the output of the braking pressure generator exceeds the controlled auxiliary pressure, take a first switching position and, as soon as the controlled auxiliary pressure prevails, take the second switching position.

According to another embodiment of the present invention, a multi-directional valve is configured as a pressure-controlled four-way/two-position directional valve by way of which, in the second switching position, a piston hydraulically displaceable against spring action and serving as a pedal-travel simulator, can be connected to the output of the braking pressure generator.

Finally, the brake system can be used with an antilocking device. For this purpose, the brake system of the invention is additionally equipped with an electronic measuring, controlling and regulating circuit and with electromagnetically operable inlet and outlet valves which are inserted into the pressure fluid conduits between the pressure-controlled multidirectional valves and the wheel brakes and into the pressure fluid return conduit leading from the wheel brakes to a pressure compensating reservoir. This embodiment is capable of regulating the wheel slip in response to the rotation characteristics of the wheels.

BRIEF DESCRIPTION OF THE DRAWING

Further features, advantages and applications of the present invention can be gathered from the following description of an embodiment of this invention with reference to the accompanying drawing wherein.

DETAILED DESCRIPTION

Figure 1:
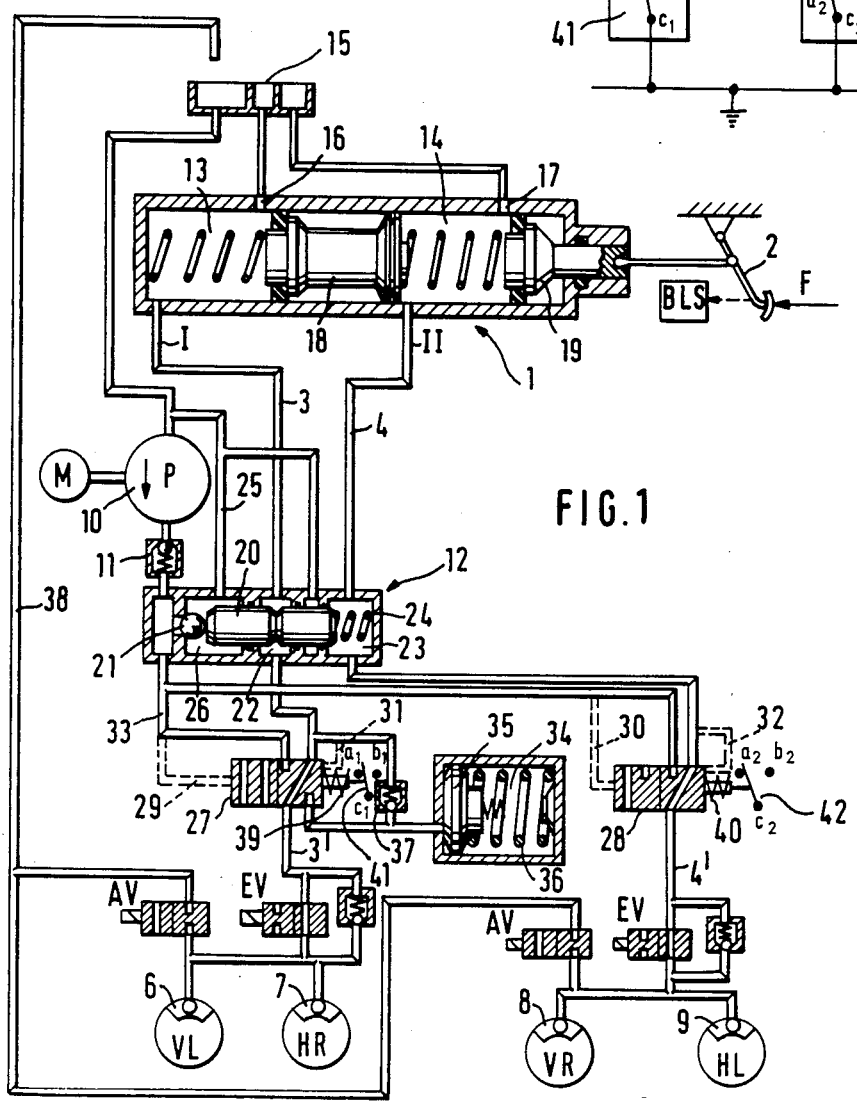
FIG. 1 is a schematically simplified view of one of the most important component parts, and of the hydraulic circuit configuration of a brake system according to one embodiment of the present invention; and, FIG. 2 is a schematically simplified view of the basic electrical interconnection of contacts of the switching mechanisms and of the stop light switch of the brake system according to FIG. 1.

According to FIG. 1, the embodiment of a system of the invention as described herein consists of a tandem master cylinder serving as a braking pressure generator 1 to which is applied a brake force F with the aid of a brake pedal 2.

Connected to the tandem master cylinder 1 and to the hydraulically separated brake circuits I,II, by way of pressure fluid conduits 3,3', 4,4', are two wheel brakes 6,7 and 8,9 respectively. In the example as shown, these are diagonally subdivided brake circuits because a brake circuit I leads to the lefthand front wheel VL and the righthand rear wheel HR, and the second brake circuit II leads to the wheels VR, HR diagonal thereto.

The system is equipped with an auxiliary pressure supply system the most important component parts of which are a hydraulic pump 10 including the appertaining check valve 11, and an auxiliary pressure control valve 12. An electric motor M continuously engaged or actuated only upon application of the brakes, or any other conventional drive may be employed for driving the hydraulic pump 10. The intake side of the hydraulic pump 10 and a variety of chambers of the auxiliary pressure control valve 12 to be described in greater detail herein below, as well as the working chamber 13,14 of the master cylinder (1) are in communication with a pressure compensating and pressure fluid supply reservoir 15. However, when applying the brakes, the so-called breather bores 16,17, by way of which working chambers 13,14 are in communication with the reservoir 15, are traversed by working pistons 18,19 of the master cylinder thereby hydraulically separating chambers 13,14 from reservoir 15.

The auxiliary pressure control valve 12 comprises a pressure-controlled split piston 20, a spherical seat valve 21 and control chambers 22,23. A relatively weak restoring spring 24 determines the position of the control valve 20 with the brake non-applied (i.e., as long as atmospheric pressure prevails in working chambers 13,14 and in control chambers 22,23).

For the return of the pressure fluid, with the spherical seat valve 21 partly opened, to the intake side of the pump and the pressure reservoir 15, respectively, a return conduit 25 is provided to which is connected a compensating chamber 26 in the auxiliary pressure control valve 12.

Moreover, in the embodiment according to the present invention as presently shown, each brake circuit I,II is respectively equipped with a double-pressure controlled multidirectional valve 27,28. The valves have two switching positions. By way of control-pressure inlets 29,31 and 30,32 the controlled auxiliary pressure, by way of an auxiliary pressure conduit 33, is respectively in communication with the double-pressure controlled valves 27,28; and, the braking pressure prevailing on the outputs of the braking pressure generator 1, in the opposite direction of operation, is in communication with the double-pressure controlled valves 27,28.

Auxiliary pressure and master cylinder-output pressure not only are applied to the control inlets 29,31 and 30,32, respectively, of the valves 27,28, but, in addition, by way of the passageways released and opened, respectively, depending on the switch position of the valves 27,28 are passed on to the brake fluid conduits 3',4' and, by way of the conduits, are passed on to the wheel brakes 6,7 and 8,9, respectively. In the inactive position (i.e. with the brake not applied) or upon commencement of the brake actuation, hydraulic connections are established between outputs I,II of the braking pressure generator 1 and the wheel brakes 6,7 and 8,9, respectively as disclosed by FIG. 1 showing the switching position of valves 27,28.

As compared therewith, in the second switching position of the valves 27,28, the controlled auxiliary pressure prevailing at the inlet of the spherical seat valve 21 and on the auxiliary-pressure conduit 33, is applied to the wheel brakes 6,7 and 8,9 respectively. In that switching position, the fluid conduits from the braking pressure generator 1 to the wheel brakes are interrupted. The pressure prevailing in brake circuits I,II and at the outputs of the braking pressure generator 1, will, however, continue to be transmitted to the control chambers 22,23 of the auxiliary control valve 12.

The double-pressure controlled multidirectional valve 28 as shown to the right, is formed as a three-way/two-position directional valve, whereas the left-hand valve 27 is a four-way/two-position directional valve comprising an additional flow path via which, in the second switch position, a pedal travel simulator 34 is in communication with brake circuit I and the working chamber 13 of the braking pressure generator 1, respectively. The pedal travel simulator 34 includes a piston 35 displaceable against the action of a restoring spring 36 by the pressure prevailing in circuit I. For restoring the piston after switching back the valve 27, into the initial position as shown, a non-return valve 37 is inserted which can open toward the braking pressure generator 1. The aforementioned second switching position is taken by valve 27 as soon as the controlled auxiliary pressure exceeds the pressure in circuit I.

Moreover, inserted between the pressure-controlled multidirectional valves 27,28 and the wheel brakes 6–9, are electromagnetically controllable two-way/two-position valves EV switched to "passage" in the inactive position and which, upon change-over, interrupt the pressure fluid flow. Two similar outlet valves AV which, however, in the inactive position, are switched to "blocking", establish a connection between the wheel brakes 6–9, by way of a return conduit 38, and the pressure compensating reservoir 15. With the aid of valves EV and AV, in conjunction with an electronic measuring, controlling and regulating circuit (not shown), a slip control can be realized preventing the wheels from locking and avoiding the dangerous vehicle conditions caused by locking.

The valve restoring springs 39,40 as graphically illustrated are designed to define the initial or inactive position of the pressure-controlled valves 27,28. Moreover, by way of such springs, the response or change-over differential pressure can be predetermined, at which the valves 27,28 pass over into their second switching position. In other embodiments of the invention, such springs are eliminated because on commencement of a brake operation, valves 27,28 via control inlets 31,32, are restored into their initial position.

Figure 2:
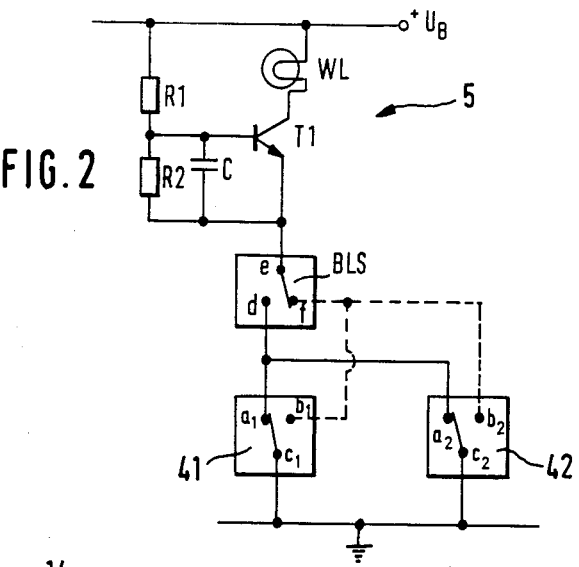

Valves 27,28, in the practice of the invention, are equipped with switching mechanisms 41,42, the output signal of which changes with each valve actuation. In the example as shown, which exhibits a praticularly simple construction, the switch mechanisms 41,42 comprise, as an essential component part thereof, an inactive contact, via connections $a_1c_1, a_2c_2$ of which, in the inactive or initial position of the valves 27,28, a circuit can be closed as shown by FIG. 2. By extension to a switch-over contact as symbolically indicated by connections b1, b2, signal combinations of different types can be realized by a switching mechanism of this type without incurring any notable extra efforts.

The mode of operation of the brake system according to the invention is as follows:

When applying the brake (i.e., when exerting a force in the direction of the arrow F on brake pedal 2) in the working chambers 13, 14 of the tandem master cylinder serving therein as the braking pressure generator (1), braking pressure is generated and, by way of brake circuits I, II, through pressure-controlled multi-directional valves 27,28 and inlet valves EV, is transmitted to the wheel brakes 6–9. The brake pressure, at that time, by way of control chambers 22, 23, is transmitted to control piston 20 and, by way of the latter, to the spherical seat valve 21, thereby generating in the auxiliary energy supply system an auxiliary pressure proportional to the pressure in the control chambers 22,23. The auxiliary pressure, soon after commencement of an application of the brake, exceeds the control pressure in circuits I,II because the face of application of the pressure on the ball of the spherical seat valve 21 is smaller than the faces of the control piston 20 to which the master cylinder-pressure is applied in the chambers 22 and 23, respectively. The control pressure at the inlets 29,30 of valves 27,28, hence, exceeds the pressure at the inputs 31,32 and results in the change-over of the two double-pressure controlled multidirectional valves 27,28 into their second switching position thereby interrupting the connection between the wheel brakes 7-9 and the braking pressure generator 1 and establishing, instead, a hydraulic connection between the wheel brakes 7–9 and the auxiliary supply system and the supply conduit 33, respectively. At the same time, by way of valve 27 and the simulator 34, another displacement of pedal 2 and, hence, a pedal travel simulation, is performed; the said pedal travel has no bearing on the pressure in the wheel brakes.

The inactive contacts $a_1c_1$, $a_2c_2$ of the switching mechanisms 41,42 combined with valves 27,28, in each changeover of the valves are opened and, during back-switching, are closed again. A breakdown of the controlled auxiliary pressure, a defective condition of valves 27 or 28, or malfunction of a brake circuit I, II, hence, will have an influence on the change-over or back-switchig of the inactive contacts of the switching mechanisms 41 and 42 respectively.

FIG. 2 shows a reasonable logical combination of the inactive contacts $a_1c_1$ and $a_2c_2$ of the switching mechanisms 41 and 42 with a work contact bls of a stop light switch BLS as also symbolically shown in FIG. 1, and with a monitoring or alarm circuit 5. A warning light WL is connected via the contacts of the switching mechanisms 41 and 42 and the bls contact, a transistor switch T1, which warning light is designed to signal defective conditions. Actuation and illumination of the warning light WL after closure of the circuit by way of contacts $a_1c_1$ and $a_2c_2$, respectively, will be time-lagged by a voltage divider R1,R2 and a capacitor C in the example of embodiment as presently described in order to preclude, with an intact system, a short-term lighting-up on commencement of the braking operation. For, when applying the brake, contact bls is switched immediately whereas switching of contacts $a_1c_1$ and $a_2c_2$ is delayed.

When using the alarm circuit 5 according to FIG. 2, the warning light WL will light up if after applying the brake (and after closure of contact bls) and upon termination of the time-lag predetermined by capacitor C, one or both of the pressure-controlled multidirectional valves 27,28 will remain in their initial position.

In the event that change-over switches are employed in place of the single-type switches, as symbolically shown in FIG. 2 by the broken lines between the connections $b_1$, $b_2$ and f, warning light WL will also light up if upon termination of the braking operation and release of the stop light switch BLS, respectively, one of the valves 27,28 or both of them will remain in the change-over position.

It should be understood that a variety of other devices for analyzing the operating or defective conditions signalled by switching mechanisms 41,42 may be employed.

What is claimed is:

1. A brake system for motor vehicles haivng wheel brakes comprising a pedal-actuated hydraulic braking pressure generator connected to wheel brakes by way of pressure fluid lines, an auxiliary pressure supply system equipped with an auxiliary pressure source and an auxiliary pressure control valve connected to said braking pressure generator for causing an auxiliary pressure proportional to the pedal force, a pressure-controlled multidirectional valve inserted into the pressure fluid conduits between the braking pressure generator and the wheel brakes and being responsive to said auxiliary pressure control valve, said pressure-controlled valve establishing in the inactive or initial position hydraulic communication between the braking pressure generator and the wheel brakes and which connects, after change-over into a second switch position in response to a build-up of pressure in said braking pressure generator, the auxiliary pressure supply system instead of the braking pressure generator to the pressure fluid conduits leading to the wheel brakes, wherein the pressure-controlled multidirectional valve (27, 28) is structurally combined with a switching mechanism (41, 42) actuated during each change-over of the valve, and wherein said switching mechanism includes means for signaling the operating condition of the brake system including a pressure breakdown in the auxiliary pressure supply system (10–12) or in the braking pressure generator (1) and valve defects.

2. A brake system according to claim 1, wherein output signals of the switching mechanism (41,42), after a logical combination with a actuating signal (switch BLS) of the brake are supplied to a monitoring alarm circuit (5).

3. A brake system according to claim 2, wherein the switching mechanism (41,42) includes inactive contacts ($a_1c_2$, $a_1c_2$) connected in series with a contact closing upon application of the brakes, including a working contact (bls) of a stop light switch (BLS), and a warning light (WL) actuated in time-lagged relationship.

4. A brake system according to claim 3, wherein the braking pressure generator (1) comprises a plurality of hydraulically separated brake circuits (I,II) in communication with the wheel brakes (6–9) by way of pressure-controlled multi-directional valves (27,28) independent of one another and respectively provided with a switching mechanism (41,42), with the inactive contacts ($a_1c_1$, $a_2c_2$) of the multidirectional valve-switching mechanism 41,42) being connected in parallel.

5. A brake system according to claim 4, wherein the multidirectional valves are double-pressure-controlled three-way/two-position directional valves (28) which, as long as the brake pressure at the output of the braking pressure generator (1) exceeds the controlled auxiliary pressure, take a first switching position, and take the second switching position when the controlled auxiliary pressure prevails.

6. A brake system according to claim 1, the pressure-controlled multidirectional valve (27) is a four-way/two-position valve by way of which, in the second switching position, a piston (35) hydraulically displaceable against spring action (spring 36) and serving as a pedal travel simulator is connected to the output of the braking pressure generator (1).

7. A brake system according to claim 4, including an electronic measuring, controlling and regulating circuit and with electromagnetically operable inlet and outlet valves (EV, AV) which are inserted into the pressure fluid conduits between the pressure-controlled multidirectional valves (27,28) and the wheel brakes (6–9), and into return conduits (38) leading from the wheel brakes (6–9) to a pressure compensating reservoir (15), and which control the wheel slip in response to the rotating characteristic of wheels (VL, VR, HL, HR).

* * * * *